United States Patent [19]

Fukai

[11] Patent Number: 5,746,836
[45] Date of Patent: May 5, 1998

[54] METHOD FOR REMOVING A PHOTOSENSITIVE LAYER FROM A PHOTOSENSITIVE DRUM

[75] Inventor: Hisayo Fukai, Tokyo, Japan

[73] Assignee: Oyentos Corporation, Japan

[21] Appl. No.: 665,819

[22] Filed: Jun. 19, 1996

Related U.S. Application Data

[62] Division of Ser. No. 319,016, Oct. 6, 1994, abandoned.

[30] Foreign Application Priority Data

Oct. 7, 1993 [JP] Japan .................. 5-251724
Sep. 28, 1994 [JP] Japan .................. 6-233231

[51] Int. Cl.$^6$ .................. G03G 13/28; G03G 5/05
[52] U.S. Cl. .................. 134/1; 216/90; 134/34
[58] Field of Search .................. 134/1, 34, 38; 216/90; 252/DIG. 8, 174.19, 174.21, 548, 550, 170, 171, 542, 173, 162

[56] References Cited

U.S. PATENT DOCUMENTS

| | | | |
|---|---|---|---|
| 3,702,303 | 11/1972 | Clemens et al. | 252/163 |
| 4,120,810 | 10/1978 | Palmer | 252/153 |
| 4,269,930 | 5/1981 | Kress | 430/270 |
| 4,645,617 | 2/1987 | Vivian | 252/165 |
| 4,780,235 | 10/1988 | Jackson | 252/170 |
| 4,927,556 | 5/1990 | Pokorny | 252/173 |
| 5,004,509 | 4/1991 | Bristol | 148/23 |
| 5,008,031 | 4/1991 | Schulz et al. | 252/168 |
| 5,015,410 | 5/1991 | Sullivan | 252/166 |
| 5,030,290 | 7/1991 | Davis | 134/4 |
| 5,049,314 | 9/1991 | Short | 252/542 |
| 5,089,164 | 2/1992 | Stanley | 252/162 |
| 5,096,501 | 3/1992 | Dishart et al. | 134/10 |
| 5,230,821 | 7/1993 | Larson et al. | 252/170 |
| 5,334,255 | 8/1994 | James et al. | 137/38 |
| 5,334,331 | 8/1994 | Fusiak | 252/542 |
| 5,354,492 | 10/1994 | Short | 252/162 |
| 5,415,800 | 5/1995 | Motsenbocker | 252/170 |

FOREIGN PATENT DOCUMENTS

| | | |
|---|---|---|
| 57-83598 | 5/1982 | Japan . |
| 60-095544 | 5/1985 | Japan . |
| 5061275 | 3/1993 | Japan . |
| 5181289 | 7/1993 | Japan . |
| 6003832 | 1/1994 | Japan . |
| 91/09104 | 6/1991 | WIPO . |

OTHER PUBLICATIONS

"3–Methyl–3–Methoxy Butanol" trade literature, Kuraray Co Ltd Feb. 1992.

Primary Examiner—R. Bruce Breneman
Assistant Examiner—George Goudreau
Attorney, Agent, or Firm—Wenderoth, Lind & Ponack

[57] ABSTRACT

Method for separating and removing a photosensitive layer, containing a binder resin, from a photosensitive drum, by immersing the photosensitive drum in an aqueous composition of water and an organic compound capable of dissolving or wetting the resin binder of the photosensitive resin in an oil-in-water dispersion.

16 Claims, No Drawings

METHOD FOR REMOVING A PHOTOSENSITIVE LAYER FROM A PHOTOSENSITIVE DRUM

This application is a divisional of now abandoned application, Ser. No. 08/319,016, filed Oct. 6, 1994.

BACKGROUND OF THE INVENTION

The present invention relates to a chemical composition for removing organic adherent matters, which include synthetic resins such as a toner, a printing ink, and an oil, from an adherend such as a metal, glass, plastic, concrete, or paper.

It is known to use an organic solvent or water-soluble detergent for removing organic adherent matters (referred to as "adherents" hereinafter) including resins, mineral oil, and lubricants, from metal, glass, plastic, concrete, or paper materials (referred to as an adherend hereinafter).

Such an organic solvent, when used to remove adherents from an adherend, however performs a dissolving action which causes a portion of the removed adherent to dissolve in the solvent. This results in decline in the dissolving power of the solvent and can result in the reattachment of the removed adherent to the adherend.

A water-soluble detergent can hardly remove resins. Otherwise, a resin, if removed by the action of the detergent, would be dissolved in the water-soluble detergent solution, which will in turn be degraded and lessened in the power of cleaning. It can thus be said that a water-soluble detergent has a limited range of use.

Any conventional organic solvent or water-soluble detergent is capable of removing only a specific group of adherents and its removing power is too low to be practical.

For disposal of unwanted runner rollers made by coating steel cores with rubber layers and used bumpers made by protecting steel bodies with urethane resin coatings, the rubber layers and urethane coatings are mechanically separated or incinerated to recover steel materials. Such a process is, however, low in the workability and the incineration will produce amounts of toxic gas causing environmental disruption. When the rubber layers and urethane coatings are dissolved using a solvent, they can never be reclaimed.

Also, the cost of the solvent is not negligible.

We, the inventors, have proposed a couple of novel compositions for removing paint or varnish which replace the conventional solvent with a lower boiling point solvent composition, as disclosed in Japanese patent Laid-open Publications 63-317567 (1988) and 2-267557 (1990), respectively. It has now been found that both the compositions were not final solutions to the problems addressed therein.

In particular, the former contains a thickening agent thus causing the removed adherent to be attached back to the adherend. The latter permits a part of the adherent to dissolve therein and will not be appropriate for reuse. The adherent can hardly be recovered.

It is an object of the present invention, in view of the above aspects, to provide a composition capable of removing adherents which are hardly removed with a conventional solvent or detergent and having a high durability and a versatility for multiple applications so that adherents and adherends can be recovered separately.

SUMMARY OF THE INVENTION

For achievement of the foregoing object, the composition of the present invention comprises water and an organic compound capable of dissolving or wetting adherents attached to the surface of an adherend, and the organic compound is dispersed in the water in an oil-in-water type.

In a further embodiment, the composition comprises water, a surface-active agent, and an organic compound capable of dissolving or wetting adherents attached to the surface of an adherend, and the organic compound is dispersed in the water in an oil-in-water type.

In another embodiment, the composition of the present invention comprises water, at least an additive selected from alcohols, glycol-ether, and pyrrolidone derivatives, and an organic compound capable of dissolving or wetting adherents attached to the surface of an adherend, and the organic compound is dispersed in the water in an oil-in-water type.

The composition of the present invention also comprises water, a surface-active agent, at least an additive selected from alcohols, glycol-ether, and pyrrolidone derivatives, and an organic compound capable of dissolving or wetting adherents attached to the surface of an adherend, and the organic compound is dispersed in the water in an oil-in-water type.

The oil-in-water type dispersion, as in the various embodiments, includes a mixture of a phase where a portion of the organic compound is dissolved in the water and a phase wherein the organic compound is suspended in the water phase. Separated water and organic compound, which would be made into the oil-in-water type dispersion by agitation, would be also included in this type.

The organic adherents include a dispersion of nonorganic substances as well as organic substances.

There is no specific restriction on the blend ratio between the above-exemplified organic compound and water. However, it is desired that 1 through 90% by weight of selected organic compounds be contained in the fixing-agent solution against water. Preferably, the blend ratio shall remain in a range expressed by a formula shown below:

$$\text{organic compound:water} = (\alpha+5):(100-\alpha-5)-(100-\beta-10):(\beta+10)$$

where $\alpha$ designates the limit (% by weight) of solubility of the organic compound against water, whereas $\beta$ designates the limit (% by weight) of the solubility of water against the organic compound.

There is no limit in the kind of organic compound used; it only be necessary that the organic compound be capable of dissolving or swelling organic adherent matters. Such organic compound is selected from organic ester compounds, organic hydrocarbon compounds, fatty-acid compounds, organic ketone compounds, halogenated hydrocarbon compounds, aldehyde compounds, ether compounds, heterocyclic compounds, alcoholic compounds, organic nitrogen compounds, animal oils and vegetable oils, and at least one kind of compound selectable from a group comprising derivatives of any of the above-exemplified compounds. The above-exemplified organic compounds may not necessarily be in a liquified form. For example, solid organic compound may be mixed with water or dissolved in an organic solvent.

In terms of organic ester compounds, any of those which are exemplified below may be selected; those carboxy monoesters such as ethyl acetate, ethyl oleate, ethyl acrylate, butyl palmitate, or methyl methacrylate, those dibasic carboxylic diesters such as dimethyl succinate, diethyl succinate, dibutyl succinate, dimethyl adipate, diethyl adipate, dimethyl glutarate, diethyl glutarate, diethyl phthalate, dibutyl phthalate, diethyl tartarate, or diocytl phthalate, those aliphatic ester compounds such as ethyl α-aminoate, or ethyl L-glutarate, and derivatives from the above compounds; those aromatic ester compounds such as methyl benzoate or triphenyl phosphate and derivatives from these aromatic ester compounds, cyclic ester compounds and derivative thereof, heterocyclic ester compounds such as methyl isonicotinate and derivatives thereof; and coal oxide, oil oxide, etc.

In terms of organic hydrocarbon compounds, any of those which are exemplified below may be used; vegetable oil such as tea tree oil, tall oil, or terpene oil, kerosine, fluid paraffine, heptane, benzene, toluene, or cyclohexane, etc.

In terms of halogenated hydrocarbon compound, 1,1,1-trichloroethane or α-chloronaphthalene may be used.

In terms of alcoholic compounds, the following may be used; n-octyl alcohol, n-decyl alcohol, polyethylene glycohol, methyl cellosolve, tertiary amil-alcohol, phenol, benzyl alcohol, or methyl benzyl alcohol, etc.

In terms of an aliphatic compound, those which are cited below may be used; benzoic acid, alkenic succinic acid, naphthenic acid, oleic acid, or isononanic acid, etc.

In terms of a ketone compound, methylethyl ketone, or methylisobutyl ketone, may be used.

In terms of an aldehyde compound, benzaldehyde may be used.

In terms of an ether compound, ethylether, diisopropylether, or octylphenylether may be used.

In terms of an organic nitrogen compound, N,N-dimethylformaldehyde, diethylamine, aniline, or dichlorohexylamine, may be used.

In terms of a heterocyclic compound, N-methyl-2-pyrrolydon may be used for treating toners with the method related to the invention.

Among the above described organic compounds, a single organic compound may be used or a plurality of organic compounds may be used by mixing them.

Any kind of water such as pure water, distilled water, conventional tap-water, or river water, may be used.

In terms of surface active agents, any of those which are exemplified below may be used; higher aliphatic-acid metal salts such as sodium laurate or sodium oleate, anionic surface active agents such as sodium alkylbenzenesulphonate, higher alcohols (sodium lauryl sulfate, sodium cetyl sulfate, or sodium stearyl sulfate, for example); cationic surface active agents falling under quaternary ammonium salts or amine salts; and those nonionic surface active agents including alkylene-oxide (ethylene oxide or propylene oxide)-added type nonionic surface active agents such as higher alcohol (lauryl alcohol, cetyl alcohol, palm-oil reduced alcohol, oleic alcohol), alkyl (octic, nonyl or dodecyl) phenol, or aliphatic acids (stearic acid or oleic acid), or those nonionic surface active agents falling under polyhydric alcohol esters such as sorbitol or sugar esters, for example.

Normally, it is desired that 1 part or more than 1 part by weight of any of those usable surface active agents be added on the basis of 100 parts by weight of the blend of organic compound and water.

It is further desired that an amount of an assisting agent or auxiliary agent be more than 1% weight, most preferably 5–50% by weight, of any of the above described compounds, although not restricted thereto.

In terms of the glycol ether, no restriction applies since any of those which are exemplified below may be used; diethylene glycol monomethylether, diethylene glycol monobutylether, ethylene glycol monomethylether, or ethylene glycol monobutylether.

In terms of the pyrolydon derivatives, N-methyl-2-pyrolydon may be used.

In terms of alcohol, the following may be used; isopropyl alcohol or ethanol.

When implementing the inventive method by formulating a usable composition, it is suggested to properly blend an optimum amount of selected assisting agent with a predetermined amount of mixed solution of selected organic compound, water and surface-active agent, if deemed necessary.

The composition of the present invention also comprises water, a surface-active agent, an additive selected from alcohols, glycol-ether, and pyrrolidone derivatives, and less than 15% by weight of a dibasic carboxylic diester representing an organic compound, in which droplets of the organic compound are dispersed in the water.

In another embodiment, the composition is characterized in that an organic compound, capable of dissolving or wetting adherents, attached to the surface of an adherend, is dissolved in water.

The composition of the present invention also comprises water, a surface-active agent, and an organic compound capable of dissolving or wetting adherents attached to the surface of an adherend, in which the organic compound is dissolved in the water.

Throughout the latter two embodiments, the organic compound may be selected from, but not limited to, N-methyl-2-pyrrolidone, triethylene glycol dimethyl ether, and diethylene glycol dimethyl ether.

In this description of the present invention, "removal" means removing of adherents from an adherend by one or more of the actions of debonding, cleaning, dispersion, departing, aggregation, and other appropriate manners.

The adherents which can be removed from an adherend, e.g., iron, stainless, steel, non-ferrous metal, glass, plastics, clothes, tile, concrete wall, wood, rubber, or paper, by the composition of the present invention are resins (and resin-based bonding or thickening agents) including alkyd resins (e.g., short-oil alkyds, medium-oil alkyds, long-oil alkyds, phenol modified alkyds, or vinyl modified alkyds), acrylic resins, acrylic styrene resins, amino resins, polyvinyl chloride resins, polyvinyl acetate resins, and polyester resins, oils (e.g., petroleum grease, silicon grease, anti-corrosion oil, cutting oil, press oil, hardening oil, metal working lubricants such as rolling oil, and wax), inks for, e.g., oil markers, ballpoint pens, and color printing, toners for copying machines, and paints such as lacquers and pigmented oils. Also, stains of lipstick color, cooking sauce (e.g., Worcestershire, ketchup or mayonnaise), coffee, cocoa, and others attached to clothes and garments can be eliminated and spots of chewing gum on a floor or ground can be removed by the action of the composition of the present invention. It would be understood that for removal of the adherent of a plastic material, the organic compound in the composition of the present invention has to be selected from a specific group which does not chemically attack a plastic material.

The procedure of removing such adherents using the composition of the present invention comprises immersing the adherend with the adherents in a liquid form of the composition or applying drops of the composition directly onto the adherents, and after several seconds to ten minutes, rubbing with a rag of dry fabric or scraping with a knife over the surface of the adherend. If necessary, the procedure may be repeated several times until all the adherents are removed from the adherend. It is a good idea to use an ultrasonic cleaner for increasing the cleaning power.

When the composition is used for spraying directly to adherents or the adherents are immersed in a liquid phase of the composition, the organic compound acts as an organic solvent on the organic adherents for dissolution, permeation, and swelling. Because of the presence of a continuous or water phase about the organic compound, the adherents removed are not dissolved in the organic compound but remain in a gum form as suspended in the water. Accordingly, the adherents can easily be separated and recovered as a solid substance.

The additive accelerates the dispersion of the components of the composition, thus increasing the removing power and minimizing the use of the surface-active agent.

Similarly, when the composition as described in the last two described embodiments is used for spraying directly to adherents or the adherents are immersed in a liquid phase of the composition, the organic compound acts as an organic solvent on the organic adherents for dissolution, permeation, and swelling. In this case, the organic compound remains dissolved in the water, thus preventing dissolution of the adherents removed. Accordingly, the adherents can easily be separated in a gum form and recovered as a solid substance.

DETAILED DESCRIPTION OF THE PREFERRED EXAMPLES

The present invention will be described in more detail in conjunction with but not limited to the preferred examples.

Groups A to G of compositions and groups J-1 and H of solvents were prepared as below:

Group A

| Composition A-1 (O/W type) | |
|---|---|
| dibasic carboxylic diester (dimethyl adipate 17 wt %, dimethyl glutarate 66 wt %, dimethyl succinate 17 wt %) | 8 wt % |
| water | 92 wt % |
| Composition A-2 (O/W type) | |
| dibasic carboxylic diester (dimethyl adipate 17 wt %, dimethyl glutarate 66 wt %, dimethyl succinate 17 wt %) | 15 wt % |
| water | 83 wt % |
| Composition A-3 (O/W type) | |
| dibasic carboxylic diester (dimethyl adipate 17 wt %, dimethyl glutarate 66 wt %, dimethyl succinate 17 wt %) | 30 wt % |
| water | 70 wt % |
| Composition A-4 (O/W type) | |
| dibasic carboxylic diester (dimethyl adipate 17 wt %, dimethyl glutarate 66 wt %, dimethyl succinate 17 wt %) | 50 wt % |
| water | 50 wt % |
| Composition A-5 (O/W type) | |
| dibasic carboxylic diester (dimethyl adipate 17 wt %, dimethyl glutarate 66 wt %, dimethyl succinate 17 wt %) | 80 wt % |
| water | 20 wt % |
| Composition A-6 (O/W type) | |
| dimethyl succinate | 20 wt % |
| water | 80 wt % |
| Composition A-7 (O/W type) | |
| dimethyl succinate | 18 wt % |
| diethyl succinate | 32 wt % |
| water | 50 wt % |
| Composition A-8 (O/W type) | |
| dimethyl glutarate | 30 wt % |
| water | 70 wt % |
| Composition A-9 (O/W type) | |
| dimethyl glutarate | 70 wt % |
| water | 30 wt % |
| Composition A-10 (O/W type) | |
| benzyl alcohol | 20 wt % |
| water | 80 wt % |
| Composition A-11 (O/W type) | |
| benzyl alcohol | 90 wt % |
| water | 10 wt % |
| Composition A-12 (O/W type) | |
| propylene carbonate | 30 wt % |
| water | 70 wt % |
| Composition A-13 (O/W type) | |
| propylene carbonate | 85 wt % |
| water | 15 wt % |
| Composition A-14 (O/W type) | |
| methylbenzyl alcohol | 40 wt % |
| water | 60 wt % |
| Composition A-15 (O/W type) | |
| tea tree oil | 25 wt % |
| water | 75 wt % |
| Composition A-16 (O/W type) | |
| toluene | 35 wt % |
| water | 65 wt % |
| Composition A-17 (O/W type) | |
| methylethyl ketone | 50 wt % |
| water | 50 wt % |
| Composition A-18 (O/W type) | |
| dibutyl lactate | 10 wt % |
| water | 90 wt % |
| Composition A-19 (O/W type) | |
| dibutyl lactate | 30 wt % |
| water | 70 wt % |
| Composition A-20 (O/W type) | |
| dibutyl lactate | 80 wt % |
| water | 20 wt % |
| GROUP B | |
| Composition B-1 (O/W type) | |
| dibasic carboxylic diester (dimethyl adipate 17 wt %, dimethyl glutarate 66 wt %, dimethyl succinate 17 wt %) | 15 wt % |
| sodium sulfate of butyl oleate | 20 wt % |
| polyoxyethylene alkylphenyl ether | 8 wt % |
| water | 57 wt % |
| Composition B-2 (O/W type) | |
| dibasic carboxylic diester (dimethyl adipate 17 wt %, dimethyl glutarate 66 wt %, dimethyl succinate 17 wt %) | 30 wt % |
| sodium sulfate of butyl oleate | 20 wt % |
| polyoxyethylene alkylphenyl ether | 12 wt % |
| water | 38 wt % |
| Composition B-3 (O/W type) | |
| dibasic carboxylic diester (dimethyl adipate 17 wt %, dimethyl glutarate 66 wt %, dimethyl succinate 17 wt %) | 30 wt % |
| sodium sulfate of butyl oleate | 30 wt % |
| polyoxyethylene alkylphenyl ether | 10 wt % |
| water | 10 wt % |
| Composition B-4 (O/W type) | |
| dibasic carboxylic diester (dimethyl adipate 17 wt %, dimethyl glutarate 66 wt %, dimethyl succinate 17 wt %) | 60 wt % |
| sodium sulfate of butyl oleate | 20 wt % |
| polyoxyethylene alkylphenyl ether | 10 wt % |
| water | 10 wt % |
| Composition B-5 (O/W type) | |
| dimethyl succinate | 25 wt % |
| sodium sulfate of butyl oleate | 20 wt % |
| polyoxyethylene alkylphenyl ether | 9 wt % |
| water | 46 wt % |

Composition B-6 (O/W type)

| | |
|---|---|
| dimethyl succinate | 70 wt % |
| sodium sulfate of butyl oleate | 10 wt % |
| polyoxyethylene alkylphenyl ether | 5 wt % |
| triethanolamine | 5 wt % |
| water | 46 wt % |

Composition B-7 (O/W type)

| | |
|---|---|
| dimethyl succinate | 20 wt % |
| dimethyl glutarate | 30 wt % |
| sodium sulfate of butyl oleate | 20 wt % |
| polyoxyethylene alkylphenyl ether | 10 wt % |
| water | 20 wt % |

Composition B-8 (O/W type)

| | |
|---|---|
| diethyl phthalate | 40 wt % |
| dimethyl adipate | 10 wt % |
| sodium sulfate of butyl oleate | 25 wt % |
| polyoxyethylene alkylphenyl ether | 10 wt % |
| water | 15 wt % |

Composition B-9 (O/W type)

| | |
|---|---|
| diethyl succinate | 30 wt % |
| dimethyl succinate | 30 wt % |
| sodium sulfate of butyl oleate | 20 wt % |
| polyoxyethylene alkylphenyl ether | 7 wt % |
| water | 13 wt % |

Composition B-10 (O/W type)

| | |
|---|---|
| benzyl alcohol | 8 wt % |
| sodium sulfate of butyl oleate | 10 wt % |
| polyoxyethylene alkylphenyl ether | 7 wt % |
| water | 75 wt % |

Composition B-11 (O/W type)

| | |
|---|---|
| benzyl alcohol | 15 wt % |
| sodium sulfate of butyl oleate | 15 wt % |
| polyoxyethylene alkyl phenyl ether | 9 wt % |
| water | 61 wt % |

Composition B-12 (O/W type)

| | |
|---|---|
| benzyl alcohol | 5 wt % |
| dibasic carboxylic diester (dimethyl adipate 17 wt %, dimethyl glutarate 66 wt %, dimethyl succinate 17 wt %) | 10 wt % |
| sodium sulfate of butyl oleate | 15 wt % |
| polyoxyethylene alkylphenyl ether | 10 wt % |
| water | 60 wt % |

Composition B-13 (O/W type)

| | |
|---|---|
| benzyl alcohol | 50 wt % |
| sodium sulfate of butyl oleate | 20 wt % |
| polyoxyethylene alkylphenyl ether | 10 wt % |
| water | 20 wt % |

Composition B-14 (O/W type)

| | |
|---|---|
| benzyl alcohol | 80 wt % |
| sodium sulfate of butyl oleate | 7 wt % |
| polyoxyethylene alkylphenyl ether | 3 wt % |
| water | 10 wt % |

Composition B-15 (O/W type)

| | |
|---|---|
| methylethyl ketone | 8 wt % |
| sodium sulfate of butyl oleate | 10 wt % |
| polyoxyethylene alkylphenyl ether | 7 wt % |
| water | 75 wt % |

Composition B-16 (O/W type)

| | |
|---|---|
| methylethyl ketone | 15 wt % |
| sodium sulfate of butyl oleate | 15 wt % |
| polyoxyethylene alkylphenyl ether | 10 wt % |
| water | 60 wt % |

Composition B-17 (O/W type)

| | |
|---|---|
| methylethyl ketone | 40 wt % |
| sodium sulfate of butyl oleate | 15 wt % |
| polyoxyethylene alkylphenyl ether | 8 wt % |
| diethanol amido oleate | 3 wt % |
| water | 34 wt % |

Composition B-18 (O/W type)

| | |
|---|---|
| toluene | 15 wt % |
| sodium sulfate of butyl oleate | 13 wt % |
| polyoxyethylene alkylphenyl ether | 8 wt % |
| water | 64 wt % |

Composition B-19 (O/W type)

| | |
|---|---|
| toluene | 40 wt % |
| sodium sulfate of butyl oleate | 20 wt % |
| polyoxyethylene alkylphenyl ether | 10 wt % |
| water | 30 wt % |

Composition B-20 (O/W type)

| | |
|---|---|
| tea tree oil | 7 wt % |
| sodium sulfate of butyl oleate | 9 wt % |
| polyoxyethylene alkylphenyl ether | 4 wt % |
| water | 80 wt % |

Composition B-21 (O/W type)

| | |
|---|---|
| tea tree oil | 15 wt % |
| sodium sulfate of butyl oleate | 12 wt % |
| polyoxyethylene alkylphenyl ether | 5 wt % |
| water | 68 wt % |

Composition B-22 (O/W type)

| | |
|---|---|
| tea tree oil | 60 wt % |
| sodium sulfate of butyl oleate | 20 wt % |
| water | 20 wt % |

Composition B-23 (O/W type)

| | |
|---|---|
| dibutyl lactate | 5 wt % |
| sodium sulfate of butyl oleate | 15 wt % |
| polyoxyethylene alkylphenyl ether | 8 wt % |
| water | 72 wt % |

Composition B-24 (O/W type)

| | |
|---|---|
| dibutyl lactate | 30 wt % |
| sodium sulfate of butyl oleate | 15 wt % |
| diethanol amido oleate | 7 wt % |
| polyoxyethylene alkylphenyl ether | 8 wt % |
| water | 40 wt % |

Composition B-25 (O/W type)

| | |
|---|---|
| dibasic carboxylic diester (dimethyl adipate 17 wt %, dimethyl glutarate 66 wt %, dimethyl succinate 17 wt %) | 25 wt % |
| sodium sulfate of butyl oleate | 18 wt % |
| diethanol amido oleate | 7 wt % |
| polyoxyethylene alkylphenyl ether | 10 wt % |
| tea tree oil | 5 wt % |
| water | 35 wt % |

Composition B-26 (O/W type)

| | |
|---|---|
| dimethyl succinate | 10 wt % |
| diethyl succinate | 10 wt % |
| sodium sulfate of butyl oleate | 20 wt % |
| diethanol amido oleate | 5 wt % |
| tea tree oil | 0.5 wt % |
| water | 54.5 wt % |

GROUP C

Composition C-1 (O/W type)

| | |
|---|---|
| dibasic carboxylic diester (dimethyl adipate 17 wt %, dimethyl glutarate 66 wt %, dimethyl succinate 17wt %) | 20 wt % |
| 3 methyl-3 methoxybutanol | 30 wt % |
| isopropyl alcohol | 8 wt % |
| water | 42 wt % |

Composition C-2 (O/W type)

| | |
|---|---|
| dibasic carboxylic diester (dimethyl adipate 17 wt %, dimethyl glutarate 66 wt %, dimethyl succinate 17 wt %) | 40 wt % |
| N methyl-2-pyrrolidone | 15 wt % |
| 3 methyl-3 methoxybutanol | 10 wt % |
| isopropyl alcohol | 5 wt % |
| water | 30 wt % |

Composition C-3 (O/W type)

| | |
|---|---|
| dibasic carboxylic diester (dimethyl adipate 17 wt %, dimethyl glutarate 66 wt %, dimethyl succinate 17 wt %) | 70 wt % |

| -continued | |
|---|---|
| N methyl-2-pyrrolidone | 20 wt % |
| water | 10 wt % |
| Composition C-4 (O/W type) | |
| dibasic carboxylic diester (dimethyl adipate 17 wt %, dimethyl glutarate 66 wt %, dimethyl succinate 17 wt %) | 55 wt % |
| N methyl-2-pyrrolidone | 15 wt % |
| 3 methyl-3 methoxybutanol | 10 wt % |
| water | 20 wt % |
| Composition C-5 (O/W type) | |
| dimethyl succinate | 25 wt % |
| N methyl-2-pyrrolidone | 25 wt % |
| 3 methyl-3 methoxybutanol | 10 wt % |
| water | 40 wt % |
| Composition C-6 (O/W type) | |
| dimethyl succinate | 15 wt % |
| diethyl succinate | 10 wt % |
| dimethyl glutarate | 10 wt % |
| N methyl-2-pyrrolidone | 20 wt % |
| 3 methyl-3 methoxybutanol | 10 wt % |
| isopropyl alcohol | 5 wt % |
| water | 30 wt % |
| Composition C-7 (O/W type) | |
| diethyl phthalate | 15 wt % |
| dimethyl adipate | 15 wt % |
| 3 methyl-3 methoxybutanol | 30 wt % |
| isopropyl alcohol | 5 wt % |
| water | 35 wt % |
| Composition C-8 (O/W type) | |
| propylene carbonate | 60 wt % |
| 3 methyl-3 methoxybutanol | 20 wt % |
| N methyl-2-pyrrolidone | 10 wt % |
| water | 10 wt % |
| Composition C-9 (O/W type) | |
| benzyl alcohol | 25 wt % |
| N methyl-2-pyrrolidone | 20 wt % |
| 3 methyl-3 methoxybutanol | 10 wt % |
| water | 45 wt % |
| Composition C-10 (O/W type) | |
| benzyl alcohol | 40 wt % |
| 3 methyl-3 methoxybutanol | 20 wt % |
| N methyl-2-pyrrolidone | 20 wt % |
| water | 20 wt % |
| Composition C-11 (O/W type) | |
| benzyl alcohol | 70 wt % |
| 3 methyl-3 methoxybutanol | 10 wt % |
| N methyl-2-pyrrolidone | 10 wt % |
| water | 10 wt % |
| Composition C-12 (O/W type) | |
| methyl benzyl alcohol | 70 wt % |
| N methyl-2-pyrrolidone | 20 wt % |
| 3 methyl-3 methoxybutanol | 10 wt % |
| isopropyl alcohol | 7 wt % |
| water | 33 wt % |
| Composition C-13 (O/W type) | |
| tea tree oil | 20 wt % |
| N methyl-2-pyrrolidone | 20 wt % |
| 3 methyl-3 methoxybutanol | 10 wt % |
| isopropyl alcohol | 10 wt % |
| water | 40 wt % |
| Composition C-14 (O/W type) | |
| tea tree oil | 60 wt % |
| N methyl-2-pyrrolidone | 20 wt % |
| water | 20 wt % |
| Composition C-15 (O/W type) | |
| toluene | 25 wt % |
| N methyl-2-pyrrolidone | 20 wt % |
| isopropyl alcohol | 10 wt % |
| water | 45 wt % |
| Composition C-16 (O/W type) | |
| benzyl alcohol | 13 wt % |
| 3 methyl-3 methoxybutanol | 30 wt % |
| water | 57 wt % |
| Composition C-17 (O/W type) | |
| tea tree oil | 10 wt % |
| 3 methyl-3 methoxybutanol | 20 wt % |
| isopropyl alcohol | 5 wt % |
| water | 65 wt % |
| Composition C-18 (O/W type) | |
| toluene | 12 wt % |
| 3 methyl-3 methoxybutanol | 20 wt % |
| N methyl-2-pyrrolidone | 5 wt % |
| water | 63 wt % |
| Composition C-19 (O/W type) | |
| methylethyl ketone | 13 wt % |
| 3 methyl-3 methoxybutanol | 20 wt % |
| isopropyl alcohol | 5 wt % |
| water | 62 wt % |
| Composition C-20 (O/W type) | |
| methylethyl ketone | 40 wt % |
| N methyl-2-pyrrolidone | 30 wt % |
| 3 methyl-3 methoxybutanol | 10 wt % |
| water | 20 wt % |
| GROUP D | |
| Composition D-1 (O/W type) | |
| dibasic carboxylic diester (dimethyl adipate 17 wt %, dimethyl glutarate 66 wt %, dimethyl succinate 17 wt %) | 20 wt % |
| 3 methyl-3 methoxybutanol | 18 wt % |
| sodium sulfate of butyl oleate | 10 wt % |
| polyoxyethylene alkylphenyl ether | 7 wt % |
| water | 45 wt % |
| Composition D-2 (O/W type) | |
| dibasic carboxylic diester (dimethyl adipate 17 wt %, dimethyl glutarate 66 wt %, dimethyl succinate 17 wt %) | 25 wt % |
| N methyl-2-pyrrolidone | 15 wt % |
| 3 methyl-3 methoxybutanol | 10 wt % |
| sodium sulfate of butyl oleate | 12.5 wt % |
| polyoxyethylene alkylphenyl ether | 7.5 wt % |
| water | 30 wt % |
| Composition D-3 (O/W type) | |
| dibasic carboxylic diester (dimethyl adipate 17 wt %, dimethyl glutarate 66 wt %, dimethyl succinate 17 wt %) | 40 wt % |
| 3 methyl-3 methoxybutanol | 40 wt % |
| diethanol amido olerate | 10 wt % |
| water | 10 wt % |
| Composition D-4 (O/W type) | |
| dibasic carboxylic diester (dimethyl adipate 17 wt %, dimethyl glutarate 66 wt %, dimethyl succinate 17 wt %) | 35 wt % |
| N methyl-2-pyrrolidone | 10 wt % |
| 3 methyl-3 methoxybutanol | 10 wt % |
| isopropyl alcohol | 10 wt % |
| diethanol amido olerate | 5 wt % |
| water | 30 wt % |
| Composition D-5 (O/W type) | |
| dimethyl succinate | 15 wt % |
| diethyl succinate | 5 wt % |
| 3 methyl-3 methoxybutanol | 20 wt % |
| sodium sulfate of butyl oleate | 13 wt % |
| polyoxyethylene alkylphenyl ether | 8 wt % |
| water | 39 wt % |
| Composition D-6 (O/W type) | |
| dimethyl succinate | 20 wt % |
| diethyl succinate | 10 wt % |
| dimethyl glutarate | 10 wt % |
| 3 methyl-3 methoxybutanol | 20 wt % |
| N methyl-2-pyrrolidone | 15 wt % |
| diethanol amido olerate | 5 wt % |
| water | 20 wt % |

Composition D-7 (O/W type)

| | |
|---|---|
| dimethyl succinate | 30 wt % |
| dimethyl adipate | 15 wt % |
| N methyl-2-pyrrolidone | 35 wt % |
| diethanol amido olerate | 5 wt % |
| water | 15 wt % |

Composition D-8 (O/W type)

| | |
|---|---|
| propylene carbonate | 25 wt % |
| 3 methyl-3 methoxybutanol | 15 wt % |
| N methyl-2-pyrrolidone | 10 wt % |
| isopropyl alcohol | 5 wt % |
| diethanol amido olerate | 5 wt % |
| water | 40 wt % |

Composition D-9 (O/W type)

| | |
|---|---|
| propylene carbonate | 40 wt % |
| 3 methyl-3 methoxybutanol | 15 wt % |
| N methyl-2-pyrrolidone | 20 wt % |
| diethanol amido olerate | 10 wt % |
| water | 15 wt % |

Composition D-10 (O/W type)

| | |
|---|---|
| propylene carbonate | 20 wt % |
| dibasic carboxylic diester (dimethyl adipate 17 wt %, dimethyl glutarate 66 wt %, dimethyl succinate 17 wt %) | 25 wt % |
| N methyl-2-pyrrolidone | 20 wt % |
| 3 methyl-3 methoxybutanol | 15 wt % |
| diethanol amido olerate | 5 wt % |
| water | 15 wt % |

Composition D-11 (O/W type)

| | |
|---|---|
| benzyl alcohol | 6 wt % |
| 3 methyl-3 methoxybutanol | 10 wt % |
| sodium sulfate of butyl oleate | 7 wt % |
| polyoxy alkylene monoalkyl ether | 2 wt % |
| polyoxyethylene alkylphenyl ether | 3 wt % |
| water | 72 wt % |

Composition D-12 (O/W type)

| | |
|---|---|
| benzyl alcohol | 15 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 3 wt % |
| water | 56 wt % |

Composition D-13 (O/W type)

| | |
|---|---|
| benzyl alcohol | 45 wt % |
| N methyl-2-pyrrolidone | 30 wt % |
| diethanol amido olerate | 5 wt % |
| water | 20 wt % |

Composition D-14 (O/W type)

| | |
|---|---|
| benzyl alcohol | 7 wt % |
| dibasic carboxylic diester (dimethyl adipate 17 wt %, dimethyl glutarate 66 wt %, dimethyl succinate 17 wt %) | 18 wt % |
| N methyl-2-pyrrolidone | 15 wt % |
| 3 methyl-3 methoxybutanol | 10 wt % |
| sodium sulfate of butyl oleate | 12 wt % |
| polyoxyethylene alkylphenyl ether | 8 wt % |
| water | 30 wt % |

Composition D-15 (O/W type)

| | |
|---|---|
| toluene | 8 wt % |
| 3 methyl-3 methoxybutanol | 13 wt % |
| sodium sulfate of butyl oleate | 7 wt % |
| polyoxy alkylene monoalkyl ether | 1 wt % |
| polyoxyethylene alkylphenyl ether | 2 wt % |
| water | 69 wt % |

Composition D-16 (O/W type)

| | |
|---|---|
| toluene | 6 wt % |
| dimethyl succinate | 9 wt % |
| 3 methyl-3 methoxybutanol | 15 wt % |
| sodium sulfate of butyl oleate | 9 wt % |
| polyoxy alkylene monoalkyl ether | 1 wt % |
| polyoxyethylene alkylphenyl ether | 2 wt % |
| water | 58 wt % |

Composition D-17 (O/W type)

| | |
|---|---|
| toluene | 40 wt % |
| N methyl-2-pyrrolidone | 20 wt % |
| 3 methyl-3 Methoxybutanol | 10 wt % |
| diethanol amido olerate | 7 wt % |
| water | 23 wt % |

Composition D-18 (O/W type)

| | |
|---|---|
| methylethyl ketone | 13 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 2 wt % |
| water | 59 wt % |

Composition D-19 (O/W type)

| | |
|---|---|
| methylethyl ketone | 25 wt % |
| 3 methyl-3 methoxybutanol | 25 wt % |
| N methyl-2-pyrrolidone | 10 wt % |
| diethanol amido olerate | 5 wt % |
| water | 35 wt % |

Composition D-20 (O/W type)

| | |
|---|---|
| tea tree oil | 8 wt % |
| 3 methyl-3 methoxybutanol | 13 wt % |
| isopropyl alcohol | 5 wt % |
| sodium sulfate of butyl oleate | 7 wt % |
| polyoxyethylene alkylphenyl ether | 3 wt % |
| water | 64 wt % |

Composition D-21 (O/W type)

| | |
|---|---|
| tea tree oil | 30 wt % |
| 3 methyl-3 methoxybutanol | 20 wt % |
| N methyl-2-pyrrolidone | 10 wt % |
| diethanol amido olerate | 10 wt % |
| water | 30 wt % |

Composition D-22 (O/W type)

| | |
|---|---|
| dibasic carboxylic diester (dimethyl adipate 17 wt %, dimethyl glutarate 66 wt %, dimethyl succinate 17 wt %) | 30 wt % |
| N methyl-2-pyrrolidone | 25 wt % |
| triethylene glycol dimethyl ether | 25 wt % |
| polyoxy alkylene monoalkyl ether | 5 wt % |
| water | 15 wt % |

Composition D-23 (O/W type)

| | |
|---|---|
| dibasic carboxylic diester (dimethyl adipate 17 wt %, dimethyl glutarate 66 wt %, dimethyl succinate 17 wt %) | 30 wt % |
| N methyl-2-pyrrolidone | 25 wt % |
| diethylene glycol ethyl ether | 25 wt % |
| sodium sulfate of butyl oleate | 5 wt % |
| water | 15 wt % |

Composition D-24 (O/W type)

| | |
|---|---|
| dibasic carboxylic diester (dimethyl adipate 17 wt %, dimethyl glutarate 66 wt %, dimethyl succinate 17 wt %) | 10 wt % |
| 3 methyl-3 methoxybutanol | 10 wt % |
| sodium sulfate of butyl oleate | 6 wt % |
| polyoxy alkylene monoalkyl ether | 1.4 wt % |
| polyoxyethylene alkylphenyl ether | 1.3 wt % |
| water | 71.3 wt % |

Composition D-25 (O/W type)

| | |
|---|---|
| dibasic carboxylic diester (dimethyl adipate 17 wt %, dimethyl glutarate 66 wt %, dimethyl succinate 17 wt %) | 8 wt % |
| 3 methyl-3 methoxybutanol | 8 wt % |
| sodium sulfate of butyl oleate | 4.8 wt % |
| polyoxy alkylene monoalkyl ether | 1.0 wt % |
| polyoxyethylene alkylphenyl ether | 1.3 wt % |
| water | 76.9 wt % |

Composition D-26 (O/W type)

| | |
|---|---|
| dibasic carboxylic diester (dimethyl adipate 17 wt %, dimethyl glutarate 66 wt %, dimethyl succinate 17 wt %) | 5 wt % |
| 3 methyl-3 methoxybutanol | 5 wt % |
| sodium sulfate of butyl oleate | 3 wt % |
| polyoxy alkylene monoalkyl ether | 0.7 wt % |
| polyoxyethylene alkylphenyl ether | 0.8 wt % |
| water | 85.5 wt % |

Composition D-27 (O/W type)

| | |
|---|---|
| dibasic carboxylic diester (dimethyl adipate 17 wt %, dimethyl glutarate 66 wt %, dimethyl succinate 17 wt %) | 20 wt % |
| N methyl-2-pyrrolidone | 20 wt % |
| triethylene glycol dimethyl ether | 40 wt % |
| sodium sulfate of butyl oleate | 5 wt % |
| water | 15 wt % |

Composition D-28 (O/W type)

| | |
|---|---|
| dibasic carboxylic diester (dimethyl adipate 17 wt %, dimethyl glutarate 66 wt %, dimethyl succinate 17 wt %) | 8 wt % |
| N methyl-2-pyrrolidone | 10 wt % |
| sodium sulfate of butyl oleate | 4.8 wt % |
| polyoxy alkylene monoalkyl ether | 1.0 wt % |
| polyoxyethylene alkylphenyl ether | 1.3 wt % |
| water | 76.9 wt % |

Composition D-29 (O/W type)

| | |
|---|---|
| dimethyl phthalate | 10 wt % |
| 3 methyl-3 methoxybutanol | 10 wt % |
| sodium sulfate of butyl oleate | 6 wt % |
| polyoxy alkylene monoalkyl ether | 1.4 wt % |
| polyoxyethylene alkylphenyl ether | 8.4 wt % |
| water | 64.2 wt % |

Composition D-30 (O/W type)

| | |
|---|---|
| dimethyl phthalate | 5 wt % |
| 3 methyl-3 methoxybutanol | 15 wt % |
| sodium sulfate of butyl oleate | 3 wt % |
| polyoxy alkylene monoalkyl ether | 1 wt % |
| polyoxyethylene alkylphenyl ether | 5.7 wt % |
| water | 70.3 wt % |

Composition D-31 (O/W type)

| | |
|---|---|
| dimethyl phthalate | 15 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 12.6 wt % |
| water | 46.4 wt % |

Composition D-32 (O/W type)

| | |
|---|---|
| dimethyl phthalate | 8 wt % |
| N methyl-2-pyrrolidone | 16 wt % |
| sodium sulfate of butyl oleate | 4.8 wt % |
| polyoxy alkylene monoalkyl ether | 2 wt % |
| polyoxyethylene alkylphenyl ether | 7.4 wt % |
| water | 61.8 wt % |

Composition D-33 (O/W type)

| | |
|---|---|
| dimethyl phthalate | 5.3 wt % |
| 3 methyl-3 methoxybutanol | 5.3 wt % |
| sodium sulfate of butyl oleate | 3.2 wt % |
| polyoxy alkylene monoalkyl ether | 0.5 wt % |
| polyoxyethylene alkylphenyl ether | 6.0 wt % |
| water | 79.7 wt % |

Composition D-34 (O/W type)

| | |
|---|---|
| dibasic carboxylic diester (dimethyl adipate 17 wt %, dimethyl glutarate 66 wt %, dimethyl succinate 17 wt %) | 30 wt % |
| 3 methyl-3 methoxybutanol | 30 wt % |
| sodium sulfate of butyl oleate | 10 wt % |
| polyoxy alkylene monoalkyl ether | 2 wt % |
| polyoxyethylene alkylphenyl ether | 4 wt % |
| water | 24 wt % |

Composition D-35 (O/W type)

| | |
|---|---|
| dibasic carboxylic diester (dimethyl adipate 17 wt %, dimethyl glutarate 66 wt %, dimethyl succinate 17 wt %) | 40 wt % |
| 3 methyl-3 methoxybutanol | 25 wt % |
| sodium sulfate of butyl oleate | 20 wt % |
| polyoxy alkylene monoalkyl ether | 2 wt % |
| polyoxyethylene alkylphenyl ether | 6 wt % |
| water | 9 wt % |

Composition D-36 (O/W type)

| | |
|---|---|
| dibasic carboxylic diester (dimethyl adipate 17 wt %, dimethyl glutarate 66 wt %, dimethyl succinate 17 wt %) | 8 wt % |
| 3 methyl-3 methoxybutanol | 8 wt % |
| sodium sulfate of butyl oleate | 4.8 wt % |
| polyoxy alkylene monoalkyl ether | 1.0 wt % |
| polyoxyethylene alkylphenyl ether | 1.3 wt % |
| triethanolamine | 0.5 wt % |
| water | 76.4 wt % |

Composition D-37 (O/W type)

| | |
|---|---|
| dibasic carboxylic diester (dimethyl adipate 17 wt %, dimethyl glutarate 66 wt %, dimethyl succinate 17 wt %) | 5 wt % |
| 3 methyl-3 methoxybutanol | 5 wt % |
| sodium sulfate of butyl oleate | 3 wt % |
| polyoxy alkylene monoalkyl ether | 0.7 wt % |
| polyoxyethylene alkylphenyl ether | 0.8 wt % |
| triethanolamine | 1.0 wt % |
| water | 84.5 wt % |

Composition D-38 (O/W type)

| | |
|---|---|
| dibasic carboxylic diester (dimethyl adipate 17 wt %, dimethyl glutarate 66 wt %, dimethyl succinate 17 wt %) | 15 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 2.5 wt % |
| triethanolamine | 1.0 wt % |
| water | 55.5 wt % |

Composition D-39 (O/W type)

| | |
|---|---|
| dibasic carboxylic diester (dimethyl adipate 17 wt %, dimethyl glutarate 66 wt %, dimethyl succinate 17 wt %) | 20 wt % |
| 3 methyl-3 methoxybutanol | 20 wt % |
| sodium sulfate of butyl oleate | 12 wt % |
| polyoxy alkylene monoalkyl ether | 2.6 wt % |
| polyoxyethylene alkylphenyl ether | 3.3 wt % |
| water | 42.1 wt % |

Composition D-40 (O/W type)

| | |
|---|---|
| tea tree oil | 15 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 12.6 wt % |
| water | 46.4 wt % |

Composition D-41 (O/W type)

| | |
|---|---|
| tea tree oil | 8 wt % |
| 3 methyl-3 methoxybutanol | 8 wt % |
| sodium sulfate of butyl oleate | 4.8 wt % |
| polyoxy alkylene monoalkyl ether | 1.0 wt % |
| polyoxyethylene alkylphenyl ether | 1.3 wt % |
| water | 76.9 wt % |

Composition D-42 (O/W type)

| | |
|---|---|
| propylene carbonate | 15 wt % |
| 3 methyl-3 methoxybutanol | 17 wt % |
| sodium sulfate of butyl oleate | 9 wt % |
| polyoxy alkylene monoalkyl ether | 2 wt % |
| polyoxyethylene alkylphenyl ether | 3 wt % |
| tea tree oil | 1 wt % |
| water | 53 wt % |

GROUP E

Composition E-1 (O/W type)

| | |
|---|---|
| dibasic carboxylic diester (dimethyl adipate 17 wt %, dimethyl glutarate 66 wt %, dimethyl succinate 17 wt %) | 15 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 2.5 wt % |
| water | 56.5 wt % |

Composition E-2 (O/W type)

| | |
|---|---|
| dibasic carpoxylic diester (dimethyl adipate 17 wt %, dimethyl glutarate 66 wt %, dimethyl succinate 17 wt %) | 10 wt % |
| 3 methyl-3 methoxybutanol | 15 wt % |
| sodium sulfate of butyl oleate | 8 wt % |
| polyoxy alkylene monoalkyl ether | 1.5 wt % |
| polyoxyethylene alkylphenyl ether | 2.5 wt % |
| water | 63 wt % |

Composition E-3 (O/W type)

| | |
|---|---|
| dibasic carboxylic diester (dimethyl adipate 17 wt %, dimethyl glutarate 66 wt %, dimethyl succinate 17 wt %) | 8 wt % |
| 3 methyl-3 methoxybutanol | 12 wt % |
| sodium sulfate of butyl oleate | 8 wt % |
| polyoxy alkylene monoalkyl ether | 1 wt % |
| polyoxyethylene alkylphenyl ether | 2.5 wt % |
| water | 68.5 wt % |

Composition E-4 (O/W type)

| | |
|---|---|
| dibasic carboxylic diester (dimethyl adipate 17 wt %, dimethyl glutarate 66 wt %, dimethyl succinate 17 wt %) | 5 wt % |
| 3 methyl-3 methoxybutanol | 8 wt % |
| sodium sulfate of butyl oleate | 5 wt % |
| polyoxy alkylene monoalkyl ether | 0.5 wt % |
| polyoxyethylene alkylphenyl ether | 1.5 wt % |
| water | 80 wt % |

Composition E-5 (O/W type)

| | |
|---|---|
| dibasic carboxylic diester (dimethyl adipate 17 wt %, dimethyl glutarate 66 wt %, dimethyl succinate 17 wt %) | 2 wt % |
| 3 methyl-3 methoxybutanol | 5 wt % |
| sodium sulfate of butyl oleate | 4 wt % |
| polyoxy alkylene monoalkyl ether | 0.5 wt % |
| polyoxyethylene alkylphenyl ether | 1 wt % |
| water | 87.5 wt % |

Composition E-6 (O/W type)

| | |
|---|---|
| dimethyl succinate | 10 wt % |
| diethyl succinate | 5 wt % |
| 3 methyl-3 methoxybutanol | 15 wt % |
| N methyl-2-pyrrolidone | 3 wt % |
| sodium sulfate of butyl oleate | 9 wt % |
| polyoxy alkylene monoalkyl ether | 1 wt % |
| polyoxyethylene alkylphenyl ether | 2.5 wt % |
| water | 87.5 wt % |

Composition E-7 (O/W type)

| | |
|---|---|
| dibasic carboxylic diester (dimethyl adipate 17 wt %, dimethyl glutarate 66 wt %, dimethyl succinate 17 wt %) | 8 wt % |
| N methyl-2-pyrrolidone | 10 wt % |
| isopropyl alcohol | 5 wt % |
| sodium sulfate of butyl oleate | 6 wt % |
| polyoxyethylene alkylphenyl ether | 2 wt % |
| water | 69 wt % |

Composition E-8 (O/W type)

| | |
|---|---|
| dimethyl succinate | 5 wt % |
| diethyl adipate | 5 wt % |
| 3 methyl-3 methoxybutanol | 10 wt % |
| N methyl-2-pyrrolidone | 5 wt % |
| sodium sulfate of butyl oleate | 6 wt % |
| polyoxyethylene alkylphenyl ether | 2 wt % |
| water | 67 wt % |

Composition E-9 (O/W type)

| | |
|---|---|
| dimethyl glutarate | 7 wt % |
| diethyl glutarate | 5 wt % |
| 3 methyl-3 methoxybutanol | 15 wt % |
| sodium sulfate of butyl oleate | 9 wt % |
| polyoxy alkylene monoalkyl ether | 1 wt % |
| polyoxyethylene alkylphenyl ether | 2.5 wt % |
| water | 60.5 wt % |

Composition E-10 (O/W type)

| | |
|---|---|
| dibutyl phthalate | 9 wt % |
| 3 methyl-3 methoxybutanol | 20 wt % |
| N methyl-2-pyrrolidone | 10 wt % |
| sodium sulfate of butyl oleate | 7 wt % |
| water | 54 wt % |

Composition E-11 (O/W type)

| | |
|---|---|
| diethyl tartarate | 12 wt % |
| 3 methyl-3 methoxybutanol | 15 wt % |
| sodium sulfate of butyl oleate | 9 wt % |
| polyoxy alkylene monoalkyl ether | 2 wt % |
| polyoxyethylene alkylphenyl ether | 2 wt % |
| water | 60 wt % |

Composition E-12 (O/W type)

| | |
|---|---|
| dimethyl succinate | 5 wt % |
| 3 methyl-3 methoxybutanol | 10 wt % |
| sodium sulfate of butyl oleate | 5 wt % |
| polyoxy alkylene monoalkyl ether | 0.5 wt % |
| polyoxyethylene alkylphenyl ether | 1.5 wt % |
| water | 78 wt % |

Composition E-13 (O/W type)

| | |
|---|---|
| dimethyl succinate | 2 wt % |
| 3 methyl-3 methoxybutanol | 7 wt % |
| sodium sulfate of butyl oleate | 5 wt % |
| polyoxy alkylene monoalkyl ether | 0.5 wt % |
| polyoxyethylene alkylphenyl ether | 1.0 wt % |
| water | 84.5 wt % |

Coinposition E-14 (O/W type)

| | |
|---|---|
| dimethyl succinate | 15 wt % |
| 3 methyl-3 methoxybutanol | 18 wt % |
| tea tree oil | 1 wt % |
| sodium sulfate of butyl oleate | 9 wt % |
| polyoxy alkylene monoalkyl ether | 2 wt % |
| polyoxyethylene alkylphenyl ether | 3 wt % |
| water | 52 wt % |

Composition E-15 (O/W type)

| | |
|---|---|
| dibasic carboxylic diester (dimethyl adipate 17 wt %, dimethyl glutarate 66 wt %, dimethyl succinate 17 wt %) | 12 wt % |
| 3 methyl-3 methoxybutanol | 16 wt % |
| tea tree oil | 0.5 wt % |
| sodium sulfate of butyl oleate | 9 wt % |
| polyoxy alkylene monoalkyl ether | 2 wt % |
| polyoxyethylene alkylphenyl ether | 3 wt % |
| water | 57.5 wt % |

GROUP F

Composition F-1 (O/W type)

| | |
|---|---|
| N methyl-2-pyrrolidone | 90 wt % |
| water | 10 wt % |

Composition F-2 (O/W type)

| | |
|---|---|
| N methyl-2-pyrrolidone | 80 wt % |
| water | 20 wt % |

Composition F-3 (O/W type)

| | |
|---|---|
| N methyl-2-pyrrolidone | 70 wt % |
| water | 30 wt % |

Composition F-4 (O/W type)

| | |
|---|---|
| N methyl-2-pyrrolidone | 50 wt % |
| water | 50 wt % |

Composition F-5 (O/W type)

| | |
|---|---|
| triethylene glycol dimethyl ether | 90 wt % |
| water | 10 wt % |

Composition F-6 (O/W type)

| | |
|---|---|
| triethylene glycol dimethyl ether | 70 wt % |
| water | 30 wt % |

Composition F-7 (O/W type)

| | |
|---|---|
| diethylene glycol dimethyl ether | 80 wt % |
| water | 20 wt % |

Composition F-8 (O/W type)

| | |
|---|---|
| diethylene glycol dimethyl ether | 60 wt % |
| water | 40 wt % |

Composition F-9 (O/W type)

| | |
|---|---|
| N methyl-2-pyrrolidone | 60 wt % |
| triethylene glycol dimethyl ether | 15 wt % |
| etyl alcohol | 5 wt % |
| water | 20 wt % |

Composition F-10 (O/W type)

| | |
|---|---|
| N methyl-2-pyrrolidone | 70 wt % |
| diethylene glycol dimethyl ether | 10 wt % |
| isopropyl alcohol | 5 wt % |
| water | 15 wt % |

Composition F-11 (O/W type)

| | |
|---|---|
| diethylene glycol dimethyl ether | 60 wt % |
| water | 40 wt % |

Composition F-12 (O/W type)

| | |
|---|---|
| diethylene glycol dimethyl ether | 80 wt % |
| water | 20 wt % |

Composition F-13 (O/W type)

| | |
|---|---|
| diethylene glycol dimethyl ether | 60 wt % |
| N methyl-2-pyrrolidone | 20 wt % |
| water | 20 wt % |

GROUP G
Composition G-1 (O/W type)

| | |
|---|---|
| N methyl-2-pyrrolidone | 70 wt % |
| diethanol amido olerate | 10 wt % |
| water | 20 wt % |

Composition G-2 (O/W type)

| | |
|---|---|
| N methyl-2-pyrrolidone | 80 wt % |
| diethanol amido olerate | 3 wt % |
| water | 17 wt % |

Composition G-3 (O/W type)

| | |
|---|---|
| N methyl-2-pyrrolidone | 50 wt % |
| diethanol amido olerate | 10 wt % |
| water | 40 wt % |

Composition G-4 (O/W type)

| | |
|---|---|
| N methyl-2-pyrrolidone | 75 wt % |
| polyoxy alkylene monoalkyl ether | 5 wt % |
| water | 20 wt % |

Composition G-5 (O/W type)

| | |
|---|---|
| triethylene glycol dimethyl ether | 60 wt % |
| N methyl-2-pyrrolidone | 10 wt % |
| diethanol amido olerate | 10 wt % |
| water | 20 wt % |

Composition G-6 (O/W type)

| | |
|---|---|
| triethylene glycol dimethyl ether | 70 wt % |
| polyoxy alkylene monalkyl ether | 5 wt % |
| diethanol amido olerate | 5 wt % |
| water | 20 wt % |

Composition G-7 (O/W type)

| | |
|---|---|
| diethylene glycol dimethyl ether | 80 wt % |
| diethanol amido olerate | 5 wt % |
| water | 15 wt % |

Composition G-8 (O/W type)

| | |
|---|---|
| diethylene glycol dimethyl ether | 65 wt % |
| polyoxy alkylene monoalkyl ether | 5 wt % |
| diethanol amido oleratae | 5 wt % |
| water | 25 wt % |

Composition G-9 (O/W type)

| | |
|---|---|
| N methyl-2-pyrrolidone | 60 wt % |
| diethylene glycol dimethyl ether | 20 wt % |
| diethanol amido olerate | 5 wt % |
| water | 15 wt % |

Composition G-10 (O/W type)

| | |
|---|---|
| diethylene glycol dimethyl ether | 80 wt % |
| polyoxy alkylene monoalkyl ether | 5 wt % |
| water | 15 wt % |

Composition G-11 (O/W type)

| | |
|---|---|
| diethylene glycol dimethyl ether | 60 wt % |
| N methyl-2-pyrrolidone | 15 wt % |
| diethanol amido olerate | 3 wt % |
| sodium sulfate of butyl oleate | 7 wt % |
| water | 15 wt % |

GROUP H
Solvent H-1

| | |
|---|---|
| dibasic carboxylic diester (dimethyl adipate 17 wt %, diemthyl glutarate 66 wt %, dimethyl succinate 17 wt %) | 100 wt % |

Solvent H-2

| | |
|---|---|
| dimethyl succinate | 100 wt % |

Solvent H-3

| | |
|---|---|
| dimethyl succinate | 40 wt % |
| diethyl succinate | 60 wt % |

Solvent H-4

| | |
|---|---|
| dimethyl glutarate | 100 wt % |

Solvent H-5

| | |
|---|---|
| benzyl alcohol | 100 wt % |

Solvent H-6

| | |
|---|---|
| propylene carbonate | 100 wt % |

Solvent H-7

| | |
|---|---|
| methylbenzyl alcohol | 100 wt % |

Solvent H-8

| | |
|---|---|
| tea tree oil | 100 wt % |

Solvent H-9

| | |
|---|---|
| toluene | 100 wt % |

Solvent H-10

| | |
|---|---|
| methylethyl ketone | 100 wt % |

Solvent H-11

| | |
|---|---|
| diethyl glutarate | 100 wt % |

Solvent H-12

| | |
|---|---|
| diethyl phthalate | 100 wt % |

Solvent H-13

| | |
|---|---|
| diethyl adipate | 100 wt % |

Solvent H-14

| | |
|---|---|
| N methyl-2-pyrrolidone | 100 wt % |

Solvent H-15

| | |
|---|---|
| diethyl tartarate | 100 wt % |

Solvent H-16

| | |
|---|---|
| triethylene glycol dimethyl ether | 100 wt % |

Solvent H-17

| | |
|---|---|
| diethylene glycol eimethyl ether | 100 wt % |

Solvent H-18

| | |
|---|---|
| diethylene glycol ethyl ether | 100 wt % |

Solvent H-19

| | |
|---|---|
| dibutyl lactate | 100 wt % |

Solvent H-20

| | |
|---|---|
| chloroform | 100 wt % |

Solvent H-21

| | |
|---|---|
| dibasic carboxylic diester (dimethyl adipate 17 wt %, dimethyl glutarate 66 wt %, dimethyl succinate 17 wt %) | 15 wt % |
| 3 methyl-3 methoxybutanol | 85 wt % |

Solvent H-22

| | |
|---|---|
| dibasic carboxylic diester (dimethyl adipate 17 wt %, dimethyl glutarate 66 wt %, dimethyl succinate 17 wt %) | 8 wt % |
| 3 methyl-3 methoxybutanol | 92 wt % |

Compostion J-1 (W/O type)

| | |
|---|---|
| dimethyl phthalate | 5.3 wt % |
| 3 methyl-3 methoxybutanol | 5.3 wt % |
| sodium sulfate of butyl oleate | 3.2 wt % |
| polyoxy alkylene monoalkyl ether | 0.5 wt % |
| polyoxyethylene alkylphenyl ether | 6.0 wt % |
| water | 79.7 wt % |

In the above compositions or solvents, tea tree oil is taken out from tea tree (natural tree) made in Australia, and includes the following contents:

| | |
|---|---|
| 1,8 cineole | 9.1 wt % |
| P-cymene(isopropylemethylbenzene) | 16.4 wt % |
| terpinene-4-ol | 31.2 wt % |
| α-terpineol | 3.5 wt % |

In terms of sodium sulfate of butyl oleate, Pucowet SN-241 made by Sun Nopco k.k. is used.

EXAMPLE 1

Sheets of paper, 64 g/cm$^2$, on which a black toner including a binder of polystyrene acrylic resin had entirely been deposited were immersed in the liquid compositions of their respective groups A to G listed in Tables 1 to 6.

Then, the paper sheets were scrubbed for a given time with a magnet bar (rotor) which has an annular brush (namely, a Nylon 6 brush made by Nippon Seal) and rotates at a speed of 100 rpm, and examined for removal of the toner. The results are shown in Tables 1 to 6 with relation to the processing temperatures and durations.

As shown, the symbols ⊚, o, Δ, and x represent effects of excellent removal, good removal, partial removal, and no removal respectively.

COMPARATIVE EXAMPLE 1

Except that the compositions of the groups A to G were replaced with solvents selected from the group H and a composition J-1 shown in Tables 7 and 8, the same procedure as of Example 1 was carried out for examining the removal of the toner. The results in relation with the temperatures and durations are shown in Tables 7 and 8.

As apparent from Tables 1 to 6, the compositions of the present invention cause the toner to be favorably removed from the paper sheets without giving no damage to the paper which can thus be reused.

On the other hand, the conventional solvents allow dissolution of the toner. As the result, the toner tends to degrade the solvents and penetrate the paper sheets for preventing the reuse.

EXAMPLE 2

OHP (overhead projector) sheets (made of polyester resin) on which a black toner including a binder of polystyrene acrylic resin had entirely been deposited were immersed in the liquid compositions of their respective groups A to G listed in Tables 9 to 15. Then, the OHP sheets were scrubbed for a given time with a magnet bar (rotor) which has an annular brush (namely, a Nylon 6 brush made by Nippon Seal) and rotates at a speed of 100 rpm, and examined for removal of the toner. The results are shown in Tables 9 to 15 with relation to the processing temperatures and durations.

In Tables 9 to 15, the symbols ⊚, o, Δ, and x represent effects of excellent removal, good removal, partial removal, and no removal respectively. Further, agitation of the composition employed or not employed are marked with o and x respectively.

As apparent from Tables 9 to 15, the compositions of the present invention cause the toner to be favorably removed from the OHP sheets without giving no damage to the OHP material which can thus be reused.

EXAMPLE 3

A 30-mm diameter photosensitive drum installed in a used, life-expired Canon copying machine (and made by covering an epoxy-coated aluminum tube with an organic photosensitive layer which contains a binder of polycarbonate) was immersed in each of the liquid compositions of their respective groups A to G listed in Tables 16 to 20. Then, one or more actions of ultrasonic cleaning, agitation of the composition, and turning of the drum were conducted for accelerating the removal of the organic photosensitive layer while the drum being immersed in the composition. The results of removal in relation to the processing temperature, duration, ultrasonic cleaning (denoted as "ultrasonic" in Tables), agitation of the composition (denoted as "agitation"), and/or turning of the drum (denoted as "turning") are also shown in Tables 16 to 20.

In Tables 16 to 20, the symbols ⊚, o, Δ, and x represent effects of excellent removal, good removal, partial removal, and no removal respectively. Also, the actions employed and not employed are marked with o and x respectively.

As apparent from Tables 16 to 20, the compositions of the present invention cause the organic photosensitive layer to be readily removed from the epoxy-coated aluminum tube without giving no damage to the material surface which can thus be reused. The resin of the organic photosensitive layer is hardly dissolved in the composition and can be filtered for disposal thus keeping the composition clean and increasing its operating life.

EXAMPLE 4

A stainless steel container of a tubular shape, 30 cm in diameter and 40 cm in height, arranged capable of producing tiny bubbles of air from bottom with a compressor was provided for filling with each of the liquid compositions of their respective groups A to G listed in Table 21 to 24.

Test pieces of 15×15 cm prepared by cutting an used automobile bumper whose surface composed of polypropylene and rubber is coated with acrylic coatings were immersed in the different compositions respectively with which the stainless steel container was filled. Then, the air was supplied for bubbling the composition to accelerate the removal of the acrylic coatings from the bumper body. The results of removal in relation with the processing temperatures and durations are also shown in Tables 21 to 24. Further, in some cases, polyolefin beads of 1 to 3 mm in diameter are additionary employed to further increase the effects of bubbling, or ultrasonic cleaning is embloyed in addition to bubbling.

In Tables 21 to 24, the symbols ⊚, o, Δ, and x represent effects of instant removal, good removal, partial removal, and no removal respectively. Further, beads employed or not employed are marked with o and x respectively, and ultrasonic cleaning employed or not employed are also marked with o and x respectively.

As apparent from Tables 21 to 24, the compositions of the present invention cause the urethane coatings to be readily removed from the bumper body which can thus be recycled. The urethane resin is hardly dissolved in the composition and can be filtered for disposal thus keeping the composition clean and increasing its operating life.

EXAMPLE 5

Pieces of heat-resistant vinyl chloride adhesive tape made by Lintec k.k. were attached to stainless steel plates of 15 cm×15 cm×1 mm and exposed at surface to irradiation of infrared ray for 10 minutes before being left to stand for 48 hours. The adhesive agent used here is a mixture of butylacrylate and methylacrylate, by 90% and 10% respectively, having 500,000 of avelage molecular weight. The stainless steel plates with the tape were immersed in a water for 5 minutes under the processing temprature shown in Tables 25 to 28. Unwoven fabric strips saturated with the compositions of their respective groups A to G listed in Tables 25 to 28 were placed directly on the tape pieces of the stainless steel plates respectively while the (effectively applying) duration being varied as shown in Tables 25 to 28. The temprature of the composition is normal. It was then examined whether or not adherent components of the tape remained on the stainless steel plates after the tape pieces were removed from their respective plates. The results in relation with the temperatures are also shown in Tables 25 to 28.

The symbols ⊚, o, Δ, and x represent results of easy removal and no adherent remaining, easy removal but partial adherent remaining, not easy removal and partial adherent remaining, and not easy removal and most adherent remaining respectively.

As apparent from Tables 25 to 28, the compositions of the present invention allow the adherent tape pieces to be easily removed from the stainless steel plates without leaving any adherent substance.

EXAMPLE 6

Metal sheets having a size of 7 cm×15 cm×1 mm were immersed for 10 minutes in a cutting oil which comprises 45% by weight of #120 machine oil, 45% by weight of #60 spindle oil, and 10% by weight of chlorinated paraffin.

After taken out and left to stand for one hour, test pieces of the sheets were provided at surface with a film of the cutting oil. The test pieces were immersed in the compositions of the respective groups A to G listed in Table 29 for 5 minutes and shaped before taking out. Then, the cutting oil films on the test pieces were cleaned out using a rag of unwoven fabric.

Strips of a cellophane tape were attached to the test pieces to examine how the compositions remove the cutting oil. The results are also shown in Table 29.

The symbols ⊚, Δ, and x represent results of excellent attaching, hardly attaching and not attaching respectively.

As apparent from Table 29, the compositions of the present invention allow adherent films of the cutting oil to be readily removed from the metal sheets without leaving any stain.

EXAMPLE 7 AND COMPARATIVE EXAMPLE 2

A 10 micrometer thickness of lacquer (consisting mainly of nitrocellulose and alkyd resin) was applied onto the surface of a glass sheet, 21 cm×25 cm and dried for 24 hours. Then, the composition and the solvent listed in Tables 30 and 31 respectively were sprayed over the lacquer coating and 20 minutes later, they were cleaned out using a dry rag. The results of removal of lacquer are shown in Tables 30 and 31.

In Tables 30 and 31, the symbols ⊚, o, Δ, and x represent facts that the lacquer was turned to a powder form and thus excellently removed, that it was turned to a powder form and fairly removed, that it was partially removed, and that it was dissolved and removed or not removed respectively.

As apparent from Tables 30 and 31, the compositions of the present invention allow lacquer adherents to be readily removed without being dissolved, as compared with the conventional solvents.

EXAMPLE 8

A rubber roller comprising a steel core coated with a fused nitrile rubber (NBR) was immersed in the composition D-30 for one month. As the result, the NBR was swelled and easily removed from the steel core.

The composition D-30 was found to contain almost no components of the NBR so that it could be recycled. Accordingly, this composition of the present invention allows rubber and metals to be separated from each other for reuse.

COMPARATIVE EXAMPLE 3

A rubber roller comprising a steel core coated with a fused nitrile rubber (NBR) was immersed in a solvent of methyl-ethyl-ketone for one month. As the result, components of the NBR were dissolved in the solvent. It was also found that a container to be filled with the solvent had to be so limited as to prevent evaporation of methyl-ethyl-ketone. Due to the dissolution, the solvent cannot be reused.

EXAMPLE 9

A rag saturated with the composition D-29 was used to clean down the vinyl chloride coating of electrical cords installed in a copying machine which was soiled with toner. As the result, the toner was successfully removed without giving no damage to the vinyl chloride coating.

EXAMPLE 10

A rag saturated with the composition D-29 was used to clean down the surface of an acrylic resin plate which was fouled with dirt. As the result, the dirt was successfully removed without giving no damage to the acrylic resin plate.

EXAMPLE 11

Pieces of metal wire were blemished at its chrome plated surface with a black marker pen, left to stand for one hour, and immersed for 5 minutes in the compositions listed in Table 32 and filled in 200-ml beakers. Then, it was examined for removal of marker stains and the results are shown in Table 32.

In Table 32, the symbols ⊚ and o represent facts that the marker stain was dispersed in powder form as excellently removed and reclaimed by filtering, and that it was dispersed as removed and reclaimed by filtering respectively.

COMPARATIVE EXAMPLE 4

1,1,1-trichloroethane was used in place of the composition D-29 of Example 11. As the result, the marker stain was dissolved in the solution of 1,1,1-trichloroethane but not claimed by filtering.

COMPARATIVE EXAMPLE 5

A variety of home cleansers and industrial alkali detergents including Mamaroyal (a product of Lion Chemical) and Family Fresh (a product of Kao) were used in place of the composition D-29 of Example 11. As the result, the marker stain remained intact and not removed.

EXAMPLE 12

Sheets of stainless steel and glass were blemished with a black marker pen and after drying of the marker stain, subjected to 0.5 to 1 cc of the compositions D-27 to D-31.

As the result, the marker stain was eliminated within 10 seconds as dispersed in the form of black colored particles in the compositions.

EXAMPLE 13 AND
COMPARATIVE EXAMPLE 6

Test pieces of steel, 68 mm×150 mm, were coated with a 5 to 8 micrometer thickness of silicon glass (made by Shin-etsu Chemical) and left to stand for over 30 minutes.

0.1 to 0.5 milliliter of each of the compositions listed in Table 33 as an example of the present invention and solvents listed in Table 34 as a Comparative example was applied with a pipette to the test piece and 10 minutes later, cleaned out with a dry rag. The results are also shown in Tables 33 and 34.

In Tables 33 and 34, the symbols ⊚, o, Δ, and x represent effects of excellent peeling and removal, good peeling and removal, partial peeling and removal, and dissolution and no removal respectively.

EXAMPLE 14

When the composition W was fed and agitated in a tank which had been filled with vegetable oil, the remaining oil was successfully removed from the inner wall of the tank.

Since the composition W contains tea tree oil, it provides a germicidal effect for sanitation in the tank.

It would be understood that the compositions of the present invention are not limited to the applications above described. Other applications will be possible including removal of a film of oil on the front window of a vehicle, dirt on the wheels, and oil stains on the kitchen wall.

Also, using one of the compositions of the present invention, graphic patterns printed on a copy sheet can be transferred to another sheet without producing blurs. More specifically, a pattern of toner deposited on the paper sheet is bonded to the same by chemical action of the composition of the present invention but not by fusing with heat that is a common method employed in a conventional copying machine. It is needless to say that the toner can be bonded on pottery, resin seat, glass or clothes.

TABLE 1

| Type of Composition | Processing Time (s) | Processing temperature | Effect |
| --- | --- | --- | --- |
| B-2 | 20 | 30° C. | o |
| B-5 | 20 | 30° C. | o |
| B-10 | 30 | 30° C. | ⊚ |
| B-11 | 40 | 30° C. | o |
| B-12 | 20 | 30° C. | o |
| B-15 | 20 | 40° C. | ⊚ |
| B-16 | 20 | 40° C. | o ~ ⊚ |
| B-18 | 20 | 40° C. | o |
| B-20 | 30 | 40° C. | o ~ ⊚ |
| B-21 | 20 | 30° C. | o ~ ⊚ |
| C-1 | 20 | 30° C. | o |

TABLE 2

| Type of Composition | Processing Time (s) | Processing temperature | Effect |
| --- | --- | --- | --- |
| C-5 | 20 | 30° C. | o |
| C-9 | 25 | 30° C. | o |
| C-13 | 30 | 30° C. | ⊚ |
| C-16 | 30 | 30° C. | ⊚ |
| C-17 | 30 | 30° C. | ⊚ |
| C-18 | 30 | 40° C. | ⊚ |
| C-19 | 30 | 40° C. | ⊚ |
| D-1 | 30 | 40° C. | ⊚ |
| D-5 | 30 | 40° C. | ⊚ |
| D-11 | 60 | 30° C. | ⊚ |
| D-12 | 40 | 30° C. | ⊚ |

TABLE 3

| Type of Composition | Processing Time (s) | Processing temperature | Effect |
| --- | --- | --- | --- |
| D-15 | 40 | 30° C. | ⊚ |
| D-16 | 30 | 30° C. | ⊚ |
| D-20 | 30 | 30° C. | ⊚ |
| D-24 | 40 | 30° C. | o ~ ⊚ |
| D-28 | 20 | 30° C. | ⊚ |
| D-29 | 20 | 30° C. | o ~ ⊚ |
| D-30 | 20 | 30° C. | o |
| D-31 | 20 | 30° C. | o ~ ⊚ |
| D-32 | 40 | 40° C. | o |
| D-33 | 40 | 40° C. | o |
| D-34 | 40 | 40° C. | o |

TABLE 4

| Type of Composition | Processing Time (s) | Processing temperature | Effect |
| --- | --- | --- | --- |
| D-35 | 40 | 40° C. | o |
| D-40 | 20 | 30° C. | ⊚ |
| D-41 | 20 | 30° C. | ⊚ |
| E-1 | 50 | 30° C. | ⊚ |
| E-2 | 60 | 30° C. | ⊚ |
| E-3 | 60 | 30° C. | ⊚ |
| E-4 | 70 | 30° C. | ⊚ |
| E-6 | 30 | 30° C. | ⊚ |
| E-7 | 40 | 30° C. | ⊚ |
| E-8 | 60 | 30° C. | ⊚ |
| E-9 | 60 | 30° C. | ⊚ |

TABLE 5

| Type of Composition | Processing Time (s) | Processing temperature | Effect |
| --- | --- | --- | --- |
| E-10 | 50 | 30° C. | o |
| E-11 | 50 | 30° C. | o |
| E-12 | 60 | 30° C. | ⊚ |
| F-1 | 60 | 30° C. | ⊚ |
| F-2 | 60 | 30° C. | ⊚ |
| F-6 | 40 | 30° C. | ⊚ |
| F-7 | 40 | 30° C. | ⊚ |
| F-9 | 30 | 30° C. | ⊚ |
| F-10 | 40 | 30° C. | ⊚ |
| F-12 | 40 | 30° C. | ⊚ |
| F-13 | 40 | 30° C. | ⊚ |

TABLE 6

| Type of Composition | Processing Time (s) | Processing temperature | Effect |
| --- | --- | --- | --- |
| G-1 | 40 | 30° C. | ⊚ |
| G-2 | 40 | 30° C. | ⊚ |
| G-4 | 40 | 30° C. | o |
| G-5 | 40 | 30° C. | ⊚ |
| G-7 | 40 | 30° C. | ⊚ |
| G-9 | 40 | 30° C. | ⊚ |

TABLE 7

| Type of Solvent | Processing Time (s) | Processing temperature | Effect |
| --- | --- | --- | --- |
| H-1 | 10 | 30° C. | dissolved |
| H-2 | 10 | 30° C. | dissolved |
| H-3 | 10 | 30° C. | dissolved |
| H-4 | 10 | 30° C. | dissolved |

TABLE 7-continued

| Type of Solvent | Processing Time (s) | Processing temperature | Effect |
|---|---|---|---|
| H-5 | 10 | 30° C. | dissolved |
| H-7 | 10 | 30° C. | dissolved |
| H-8 | 10 | 30° C. | dissolved |
| H-9 | 10 | 30° C. | dissolved |
| H-10 | 10 | 30° C. | dissolved |
| H-11 | 10 | 30° C. | dissolved |
| H-12 | 10 | 30° C. | dissolved |

TABLE 8

| Type of Solvent | Processing Time (s) | Processing temperature | Effect |
|---|---|---|---|
| H-13 | 10 | 30° C. | dissolved |
| H-14 | 10 | 30° C. | dissolved |
| H-15 | 10 | 30° C. | dissolved |
| H-16 | 10 | 30° C. | dissolved |
| H-17 | 10 | 30° C. | dissolved |
| H-18 | 10 | 30° C. | dissolved |
| H-20 | 10 | 30° C. | dissolved |
| H-21 | 10 | 30° C. | dissolved |
| H-22 | 10 | 30° C. | dissolved |
| J-1 | 10 | 30° C. | dissolved |

TABLE 9

| Type of Composition | Processing Time (s) | Processing temperature | Effect | agitation |
|---|---|---|---|---|
| A-1 | 300 | 30° C. | ◉ | ○ |
| A-2 | 300 | 30° C. | ◉ | ○ |
| A-3 | 240 | 30° C. | ◉ | ○ |
| A-4 | 240 | 30° C. | ◉ | ○ |
| A-5 | 120 | 30° C. | ◉ | ○ |
| A-7 | 180 | 30° C. | ◉ | ○ |
| A-9 | 180 | 30° C. | ◉ | ○ |
| A-11 | 180 | 30° C. | ◉ | ○ |
| A-20 | 180 | 30° C. | ◉ | ○ |
| A-14 | 300 | 30° C. | ◉ | ○ |
| A-15 | 300 | 30° C. | ◉ | ○ |

TABLE 10

| Type of Composition | Processing Time (s) | Processing temperature | Effect | agitation |
|---|---|---|---|---|
| A-16 | 300 | 30° C. | ◉ | ○ |
| A-17 | 300 | 30° C. | ◉ | ○ |
| B-1 | 300 | 40° C. | ◉ | x |
| B-2 | 180 | 30° C. | ◉ | ○ |
| B-3 | 180 | 30° C. | ◉ | ○ |
| B-4 | 180 | 30° C. | ◉ | ○ |
| B-5 | 300 | 30° C. | ◉ | ○ |
| B-6 | 120 | 30° C. | ◉ | ○ |
| B-7 | 180 | 30° C. | ◉ | ○ |
| B-8 | 180 | 30° C. | ◉ | ○ |
| B-9 | 180 | 30° C. | ◉ | ○ |

TABLE 11

| Type of Composition | Processing Time (s) | Processing temperature | Effect | agitation |
|---|---|---|---|---|
| B-13 | 240 | 30° C. | ○ | ○ |
| B-14 | 240 | 30° C. | ○ | ○ |
| B-17 | 180 | 30° C. | ◉ | ○ |
| B-19 | 180 | 30° C. | ◉ | ○ |
| B-22 | 180 | 30° C. | ◉ | ○ |
| B-24 | 240 | 30° C. | ◉ | ○ |
| C-1 | 300 | 30° C. | ◉ | x |
| C-2 | 180 | 30° C. | ◉ | x |
| C-3 | 60 | 30° C. | ◉ | ○ |
| C-4 | 80 | 30° C. | ◉ | ○ |
| C-5 | 240 | 30° C. | ◉ | x |

TABLE 12

| Type of Composition | Processing Time (s) | Processing temperature | Effect | agitation |
|---|---|---|---|---|
| C-6 | 180 | 30° C. | ◉ | x |
| C-9 | 240 | 30° C. | ◉ | x |
| C-10 | 180 | 30° C. | ◉ | x |
| C-11 | 120 | 30° C. | ◉ | ○ |
| C-12 | 180 | 30° C. | ○ | x |
| C-14 | 120 | 30° C. | ◉ | ○ |
| C-15 | 240 | 30° C. | ◉ | x |
| C-16 | 420 | 30° C. | ○ | x |
| C-20 | 100 | 30° C. | ◉ | x |
| C-21 | 60 | 30° C. | ◉ | x |
| D-1 | 180 | 40° C. | ◉ | x |

TABLE 13

| Type of Composition | Processing Time (s) | Processing temperature | Effect | agitation |
|---|---|---|---|---|
| D-2 | 180 | 30° C. | ◉ | x |
| D-3 | 90 | 30° C. | ◉ | x |
| D-4 | 180 | 30° C. | ◉ | x |
| D-5 | 300 | 30° C. | ◉ | x |
| D-6 | 180 | 30° C. | ◉ | x |
| D-7 | 90 | 30° C. | ◉ | x |
| D-12 | 300 | 30° C. | ◉ | x |
| D-13 | 60 | 30° C. | ◉ | x |
| D-14 | 240 | 30° C. | ◉ | x |
| D-16 | 300 | 30° C. | ◉ | x |
| D-17 | 180 | 30° C. | ◉ | x |

TABLE 14

| Type of Composition | Processing Time (s) | Processing temperature | Effect | agitation |
|---|---|---|---|---|
| D-19 | 180 | 30° C. | ◉ | x |
| D-21 | 180 | 30° C. | ◉ | x |
| D-22 | 60 | 30° C. | ◉ | x |
| D-23 | 60 | 30° C. | ◉ | x |
| E-1 | 300 | 30° C. | ◉ | x |
| E-6 | 300 | 30° C. | ◉ | x |
| F-1 | 60 | 30° C. | ◉ | x |
| F-2 | 60 | 30° C. | ◉ | x |
| F-3 | 120 | 30° C. | ◉ | x |
| F-5 | 60 | 30° C. | ◉ | x |
| F-7 | 90 | 30° C. | ◉ | x |
| D-42 | 60 | 30° C. | ◉ | x |

TABLE 15

| Type of Composition | Processing Time (s) | Processing temperature | Effect | agitation |
|---|---|---|---|---|
| F-9 | 120 | 30° C. | ⊚ | x |
| F-10 | 60 | 30° C. | ⊚ | x |
| F-12 | 60 | 30° C. | ⊚ | x |
| F-13 | 60 | 30° C. | ⊚ | x |
| G-1 | 90 | 30° C. | ⊚ | x |
| G-2 | 90 | 30° C. | ⊚ | x |
| G-4 | 120 | 30° C. | ⊚ | x |
| G-5 | 150 | 30° C. | ⊚ | x |
| G-7 | 60 | 30° C. | ⊚ | x |
| G-10 | 60 | 30° C. | ⊚ | x |
| G-11 | 90 | 30° C. | ⊚ | x |

TABLE 16

| Type of Composition | Processing Time (min.) | Processing temperature | Effect | Ultrasonic | Turning | Agitation |
|---|---|---|---|---|---|---|
| A-4 | 60 | 60° C. | ⊚ | ○ | ○ | ○ |
| A-5 | 40 | 45° C. | ⊚ | ○ | ○ | ○ |
| A-7 | 60 | 60° C. | ⊚ | ○ | ○ | ○ |
| A-9 | 30 | 30° C. | ⊚ | ○ | ○ | ○ |
| A-11 | 60 | 30° C. | ⊚ | ○ | ○ | ○ |
| A-12 | 40 | 40° C. | ⊚ | ○ | ○ | ○ |
| A-14 | 60 | 30° C. | ⊚ | ○ | ○ | ○ |
| A-15 | 60 | 30° C. | ⊚ | ○ | ○ | ○ |
| A-16 | 30 | 30° C. | ⊚ | ○ | ○ | ○ |
| A-17 | 20 | 30° C. | ⊚ | ○ | ○ | ○ |
| B-1 | 60 | 60° C. | ⊚ | ○ | ○ | ○ |

TABLE 17

| Type of Composition | Processing Time (min.) | Processing temperature | Effect | Ultrasonic | Turning | Agitation |
|---|---|---|---|---|---|---|
| B-2 | 60 | 50° C. | ⊚ | ○ | ○ | ○ |
| B-5 | 60 | 50° C. | ⊚ | ○ | ○ | ○ |
| B-6 | 60 | 50° C. | ⊚ | x | x | ○ |
| B-9 | 60 | 50° C. | ⊚ | ○ | ○ | ○ |
| B-11 | 40 | 30° C. | ⊚ | ○ | ○ | ○ |
| B-13 | 60 | 30° C. | ⊚ | x | ○ | ○ |
| B-17 | 30 | 30° C. | ⊚ | x | ○ | ○ |
| B-19 | 30 | 30° C. | ⊚ | x | ○ | ○ |
| B-21 | 30 | 30° C. | ⊚ | x | ○ | ○ |
| B-24 | 60 | 45° C. | ⊚ | ○ | ○ | ○ |
| C-1 | 60 | 50° C. | ⊚ | ○ | ○ | ○ |

TABLE 18

| Type of Composition | Processing Time (min.) | Processing temperature | Effect | Ultrasonic | Turning | Agitation |
|---|---|---|---|---|---|---|
| C-2 | 60 | 50° C. | ○ | ○ | ○ | ○ |
| C-4 | 30 | 50° C. | ○ | x | ○ | ○ |
| C-5 | 60 | 50° C. | ⊚ | ○ | ○ | ○ |
| C-6 | 60 | 40° C. | ⊚ | ○ | ○ | ○ |
| C-8 | 60 | 50° C. | ⊚ | ○ | ○ | ○ |
| C-12 | 60 | 50° C. | ⊚ | ○ | ○ | x |
| C-13 | 60 | 30° C. | ⊚ | x | ○ | x |
| C-15 | 60 | 30° C. | ⊚ | ○ | ○ | ○ |
| C-20 | 40 | 30° C. | ⊚ | x | ○ | ○ |
| D-2 | 60 | 50° C. | ⊚ | ○ | ○ | ○ |
| D-4 | 60 | 50° C. | ⊚ | x | ○ | ○ |

TABLE 19

| Type of Composition | Processing Time (min.) | Processing temperature | Effect | Ultrasonic | Turning | Agitation |
|---|---|---|---|---|---|---|
| D-6 | 60 | 50° C. | ⊚ | ○ | ○ | ○ |
| D-9 | 30 | 50° C. | ⊚ | x | ○ | ○ |
| D-13 | 60 | 50° C. | ⊚ | ○ | ○ | ○ |
| D-17 | 60 | 30° C. | ⊚ | ○ | ○ | ○ |
| D-19 | 30 | 30° C. | ○ | x | ○ | ○ |
| D-21 | 30 | 30° C. | ⊚ | x | ○ | ○ |
| D-23 | 30 | 40° C. | ⊚ | ○ | ○ | x |
| E-1 | 60 | 50° C. | ○ | ○ | ○ | x |
| E-6 | 60 | 50° C. | ⊚ | ○ | ○ | x |
| F-1 | 60 | 50° C. | ⊚ | ○ | ○ | x |
| F-2 | 30 | 50° C. | ⊚ | x | ○ | x |

TABLE 20

| Type of Composition | Processing Time (min.) | Processing temperature | Effect | Ultrasonic | Turning | Agitation |
|---|---|---|---|---|---|---|
| F-5 | 60 | 50° C. | ⊚ | ○ | ○ | x |
| F-10 | 30 | 30° C. | ⊚ | x | ○ | x |
| F-11 | 60 | 50° C. | ⊚ | ○ | ○ | x |
| F-12 | 40 | 30° C. | ⊚ | x | ○ | x |
| F-13 | 60 | 50° C. | ⊚ | ○ | ○ | x |
| G-1 | 60 | 50° C. | ⊚ | ○ | ○ | x |
| G-4 | 30 | 30° C. | ⊚ | x | ○ | x |
| G-5 | 60 | 50° C. | ⊚ | ○ | ○ | x |
| G-7 | 30 | 30° C. | ⊚ | x | ○ | x |
| G-10 | 60 | 50° C. | ⊚ | ○ | ○ | x |

TABLE 21

| Type of Composition | Processing Time (hours) | Processing temperature | Effect | Ultrasonic | Beads |
|---|---|---|---|---|---|
| A-3 | 7 | 70° C. | ○ | x | x |
| A-3 | 3 | 60° C. | ○ ~ ⊚ | x | ○ |
| A-4 | 2 | 50° C. | ○ ~ ⊚ | x | ○ |
| A-4 | 1.5 | 50° C. | ○ ~ ⊚ | ○ | ○ |
| A-7 | 2.5 | 50° C. | ⊚ | x | ○ |
| A-12 | 3 | 60° C. | ○ ~ ⊚ | x | ○ |
| A-14 | 6 | 40° C. | ○ ~ ⊚ | x | ○ |
| B-1 | 3 | 60° C. | ⊚ | x | ○ |
| B-2 | 2.5 | 50° C. | ⊚ | x | ○ |
| B-2 | 2 | 50° C. | ⊚ | ○ | ○ |
| B-7 | 3 | 40° C. | ⊚ | x | ○ |

TABLE 22

| Type of Composition | Processing Time (hours) | Processing temperature | Effect | Ultrasonic | Beads |
|---|---|---|---|---|---|
| B-9 | 2 | 40° C. | ⊚ | x | ○ |
| B-13 | 2.5 | 50° C. | ⊚ | x | ○ |
| B-24 | 2 | 50° C. | ⊚ | x | ○ |
| C-2 | 3.5 | 40° C. | ⊚ | x | ○ |
| C-4 | 2 | 50° C. | ⊚ | x | ○ |
| C-4 | 1.5 | 50° C. | ⊚ | ○ | ○ |
| C-8 | 3.5 | 50° C. | ○ ~ ⊚ | x | ○ |
| C-10 | 3 | 50° C. | ⊚ | x | ○ |
| D-2 | 2.5 | 60° C. | ⊚ | x | ○ |
| D-3 | 2 | 50° C. | ⊚ | x | ○ |
| D-4 | 2.5 | 50° C. | ⊚ | x | ○ |

TABLE 23

| Type of Composition | Processing Time (hours) | Processing temperature | Effect | Ultra-sonic | Beads |
|---|---|---|---|---|---|
| D-5 | 3.5 | 60° C. | ○ | × | ○ |
| D-8 | 4 | 60° C. | ○ | × | ○ |
| D-10 | 2.5 | 50° C. | ⊚ | × | ○ |
| D-13 | 2.5 | 50° C. | ⊚ | × | ○ |
| D-14 | 3 | 60° C. | ⊚ | × | ○ |
| D-22 | 2 | 50° C. | ⊚ | × | ○ |
| D-23 | 2 | 50° C. | ⊚ | × | ○ |
| E-1 | 3 | 70° C. | ⊚ | × | ○ |
| E-1 | 4 | 50° C. | ⊚ | ○ | ○ |
| F-2 | 3 | 50° C. | ⊚ | × | ○ |
| F-6 | 3.5 | 50° C. | ⊚ | × | ○ |

TABLE 24

| Type of Composition | Applying duration (hours) | Processing temperature | Effect | Ultra-sonic | Beads |
|---|---|---|---|---|---|
| F-9 | 2.5 | 50° C. | ⊚ | × | ○ |
| F-13 | 2.5 | 50° C. | ⊚ | × | ○ |
| G-3 | 3 | 50° C. | ⊚ | × | ○ |
| G-11 | 2 | 50° C. | ⊚ | × | ○ |

TABLE 28

| Type of Composition | Applying duration (min.) | Processing temperature | Effect |
|---|---|---|---|
| G-2 | 10 | 5° C. | ⊚ |
| G-5 | 10 | 5° C. | ⊚ |
| G-11 | 10 | 5° C. | ⊚ |

TABLE 25

| Type of Composition | Applying duration (min.) | Processing temperature | Effect |
|---|---|---|---|
| B-1 | 10 | 30° C. | ⊚ |
| B-2 | 5 | 30° C. | ⊚ |
| B-3 | 5 | 15° C. | ⊚ |
| B-5 | 5 | 25° C. | ⊚ |
| B-6 | 5 | 5° C. | ⊚ |
| B-9 | 5 | 10° C. | ⊚ |
| B-13 | 5 | 15° C. | ⊚ |
| B-17 | 5 | 10° C. | ⊚ |
| B-18 | 5 | 25° C. | ⊚ |
| B-21 | 5 | 25° C. | ⊚ |
| B-24 | 5 | 15° C. | ⊚ |

TABLE 26

| Type of Composition | Applying duration (min.) | Processing temperature | Effect |
|---|---|---|---|
| C-1 | 10 | 20° C. | ⊚ |
| C-2 | 7 | 10° C. | ⊚ |
| C-8 | 10 | 5° C. | ⊚ |
| C-11 | 7 | 5° C. | ⊚ |
| C-13 | 10 | 25° C. | ⊚ |
| C-15 | 5 | 25° C. | ⊚ |
| D-2 | 10 | 15° C. | ⊚ |
| D-3 | 10 | 5° C. | ⊚ |
| D-4 | 5 | 15° C. | ⊚ |

TABLE 26-continued

| Type of Composition | Applying duration (min.) | Processing temperature | Effect |
|---|---|---|---|
| D-5 | 8 | 25° C. | ⊚ |
| D-9 | 5 | 15° C. | ⊚ |

TABLE 27

| Type of Composition | Applying duration (min.) | Processing temperature | Effect |
|---|---|---|---|
| D-13 | 10 | 10° C. | ⊚ |
| D-14 | 5 | 15° C. | ⊚ |
| D-17 | 10 | 10° C. | ⊚ |
| D-22 | 10 | 0° C. | ⊚ |
| D-23 | 10 | 0° C. | ⊚ |
| E-1 | 15 | 30° C. | ⊚ |
| F-1 | 10 | 5° C. | ⊚ |
| F-5 | 10 | 5° C. | ⊚ |
| F-7 | 10 | 0° C. | ⊚ |
| F-9 | 10 | 5° C. | ⊚ |
| F-13 | 10 | 0° C. | ⊚ |

TABLE 29

| Type of Composition | Processing temperature | Effect | Type of Composition | Processing temperature | Effect |
|---|---|---|---|---|---|
| B-1 | 25° C. | ⊚ | D-1 | 25° C. | ⊚ |
| B-5 | 25° C. | ⊚ | D-2 | 25° C. | ⊚ |
| B-11 | 25° C. | ⊚ | D-5 | 25° C. | ⊚ |
| B-16 | 25° C. | ⊚ | D-11 | 25° C. | ⊚ |
| B-18 | 25° C. | ⊚ | D-15 | 25° C. | ⊚ |
| B-21 | 25° C. | ⊚ | D-18 | 25° C. | ⊚ |
| C-1 | 25° C. | ⊚ | E-1 | 25° C. | ⊚ |
| C-7 | 25° C. | ⊚ | E-6 | 25° C. | ⊚ |
| C-9 | 25° C. | ⊚ | E-7 | 25° C. | ⊚ |
| C-13 | 25° C. | ⊚ | F-2 | 25° C. | ⊚ |
| C-15 | 25° C. | ⊚ | F-6 | 25° C. | ⊚ |
| G-2 | 25° C. | ⊚ | | | |

TABLE 30

| Type of Composition | Effect |
|---|---|
| D-24 | ○ |
| D-25 | ○ |
| D-27 | ⊚ |
| D-28 | ○ |
| D-34 | ⊚ |
| D-35 | ⊚ |
| D-39 | ○ |

TABLE 31

| Type of Solvent | Effect |
|---|---|
| H-1 | × |
| H-14 | × |
| H-21 | × |
| H-22 | × |

TABLE 32

| Type of Composition | Effect |
| --- | --- |
| D-24 | ⊙ |
| D-25 | ○ |
| D-27 | ⊙ |
| D-39 | ⊙ |
| D-34 | ⊙ |
| D-35 | ○ |

TABLE 33

| Type of Composition | Effect |
| --- | --- |
| D-24 | ⊙ |
| D-25 | ○ |
| D-26 | ○ |
| D-27 | ⊙ |
| D-28 | ○ |
| D-34 | ⊙ |
| D-35 | ⊙ |
| D-39 | ⊙ |

TABLE 34

| Type of Solvent | Effect |
| --- | --- |
| H-1 | x |
| H-14 | x |
| H-21 | x |
| H-22 | x |

What is claimed is:

1. A method for separating and removing a photosensitive layer containing a binder resin from a photosensitive drum, comprising:

immersing the photosensitive drum in a remover consisting essentially of water and an dibasic diester capable of dissolving or swelling the binder resin in an oil-in-water dispersion.

2. The method of claim 1, wherein the remover further consists of a surface active agent.

3. The method of claim 1, wherein the remover further consists of an additive selected from the group consisting of glycol-ethers, pyrrolidone derivatives and alcohols.

4. The method of claim 2, wherein the remover further consists of an additive selected from the group consisting of glycol-ethers, pyrrolidone derivatives and alcohols.

5. The method of claim 1, comprising the step of ultrasonic cleaning the photosensitive drum while the drum is immersed in the remover.

6. The method of claim 2, comprising the step of ultrasonic cleaning the photosensitive drum while the drum is immersed in the remover.

7. The method of claim 3, comprising the step of ultrasonic cleaning the photosensitive drum while the drum is immersed in the remover.

8. The method of claim 4, comprising the step of ultrasonic cleaning the photosensitive drum while the drum is immersed in the remover.

9. The method of claim 1, comprising the step of turning the drum while the drum is immersed in the remover.

10. The method of claim 2, comprising the step of turning the drum while the drum is immersed in the remover.

11. The method of claim 3, comprising the step of turning the drum while the drum is immersed in the remover.

12. The method of claim 4, comprising the step of turning the drum while the drum is immersed in the remover.

13. The method of claim 1, comprising the step of agitating the remover while the drum is immersed in the remover.

14. The method of claim 2, comprising the step of agitating the remover while the drum is immersed in the remover.

15. The method of claim 3, comprising the step of agitating the remover while the drum is immersed in the remover.

16. The method of claim 4, comprising the step of agitating the remover while the drum is immersed in the remover.

* * * * *